C. C. HARBRIDGE.
DEMOUNTABLE RIM.
APPLICATION FILED FEB. 13, 1911.
1,165,094.
Patented Dec. 21, 1915.
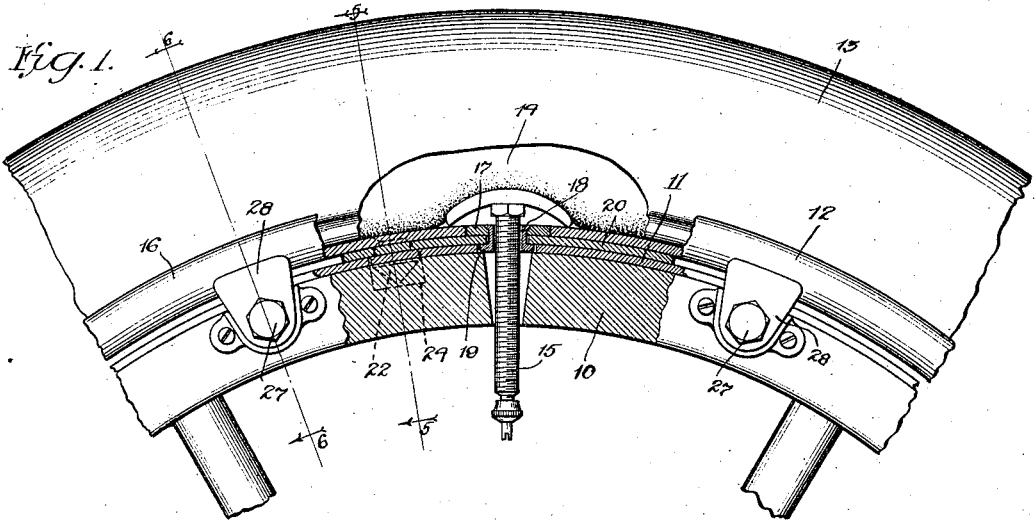
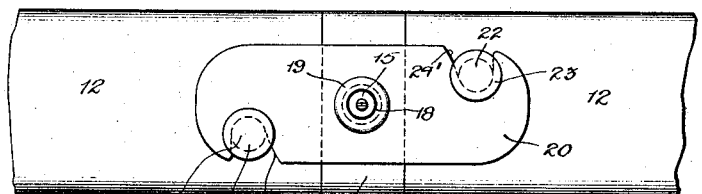
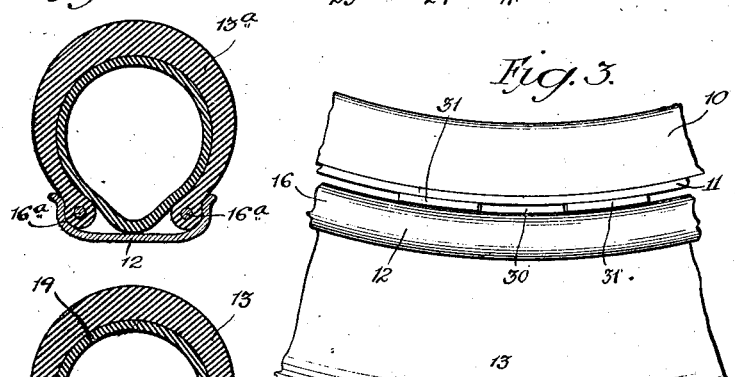
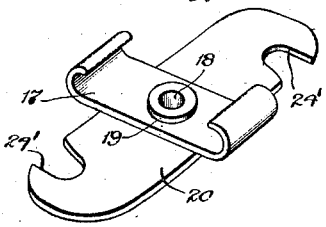
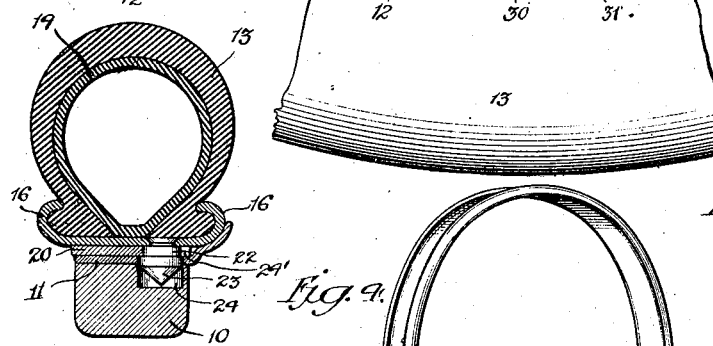
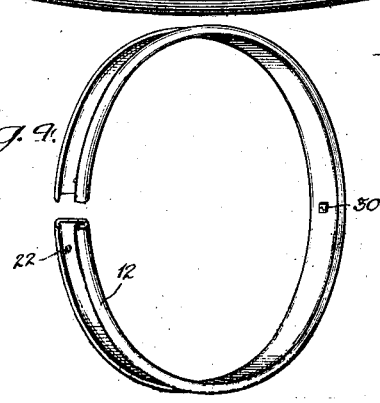
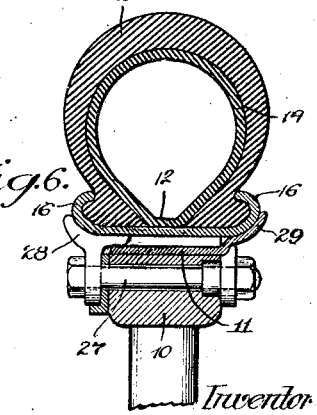
Witnesses:—
Frank W. Bemm
Amy Jehle
Inventor
Chester C. Harbridge
By: Fred Gerlach
his Atty.

UNITED STATES PATENT OFFICE.

CHESTER C. HARBRIDGE, OF CHICAGO, ILLINOIS, ASSIGNOR TO DETROIT DEMOUNTABLE RIM CO., OF DETROIT, MICHIGAN, A CORPORATION OF MICHIGAN.

DEMOUNTABLE RIM.

1,165,094.   Specification of Letters Patent.   Patented Dec. 21, 1915.

Application filed February 13, 1911. Serial No. 608,352.

*To all whom it may concern:*

Be it known that I, CHESTER C. HARBRIDGE, a resident of Chicago, in the county of Cook and State of Illinois, have invented certain new and useful Improvements in Demountable Rims, of which the following is a full, clear, and exact description.

The invention relates to demountable rims for pneumatic tires, which are adapted to facilitate replacement and removal of the tires on a vehicle-wheel. Pneumatic-tires for vehicles usually comprise an outer casing which is substantially inelastic and the invention designs to provide an improved tire-rim which may be readily and quickly placed and removed from the body of the wheel. It has herebefore been proposed to employ a split rim and means for holding the ends of the rim together when it is on the wheel. In prior constructions in which the ends of the split rim abut together, the tire could not be readily removed by reason of the pressure of the rim-ends against each other caused by the tire, and if an opening or gap were left between the abutting ends, the structure would be objectionable, because it would readily permit moisture to seep into the tire.

One object of the present invention is to provide an improved demountable rim in which there is a removable plate or rim-section between the ends of the tire-rim which extends around the wheel, and which section may be readily removed from the tire independently of the rim and which, when removed, will permit one of the rim ends to be readily sprung inwardly of the tire so that the latter may be quickly and readily removed from the rim.

The invention further designs to provide an improved demountable rim for pneumatic tires.

The invention consists in the novel features hereinafter set forth and more particularly defined by claims at the conclusion hereof.

In the drawings; Figure 1 is a side elevation of a portion of a wheel having the improved rim applied thereto, parts being shown in section. Fig. 2 is an inner face of a portion of the demountable rim and the intermediate section. Fig. 3 is a side elevation showing the interfitting lugs on the wheel-body and rim respectively, which are disposed opposite to the locking-means, and for securing a portion of the rim on the wheel. Fig. 4 is a detail perspective of the rim. Fig. 5 is a section taken on 5—5 of Fig. 1. Fig. 6 is a section taken on line 6—6 of Fig. 1. Fig. 7 is a transverse section showing the demountable rim adapted for a tire generally known as a "quick detachable" tire. Fig. 8 is a perspective of removable rim section.

The wheel-body may be of any suitable construction and comprises a felly 10 having an outer metallic band 11 shrunk thereon. A demountable rim 12 is adapted to extend around the band and is formed with flanges 16 to hold the pneumatic tire which comprises an outer casing 13 and an inner tube 14 of the usual construction. A valve 15 of usual construction is connected to the inner tube as well understood in the art.

Rim 12 is split so that when it is removed from the wheel it may be contracted or sprung inwardly or laterally to permit the tire to be readily placed thereon and removed therefrom. It will be understood that tire casings are substantially inexpansible in longitudinal direction and therefore, when the rim is split, one of its ends can be readily sprung inwardly and laterally, so that the tire may be readily separated from the rim. Tire-casings in which cables or wires are employed at the sides thereof to render the casing inexpansible and to fit within the rim-flanges, such as is shown in Fig. 7, in which 13ª designates the casing and 16ª the cables, and in which the tire valve extends through an opening adjacent one end of the split rim it is difficult to contract the rim sufficiently to permit it to be readily separated from the casing, since there must be sufficient contraction to bring the rim flanges within the casing. Heretofore it has been common practice to employ a laterally removable ring so the tire could be removed laterally from the rim. To overcome this difficulty a gap or space is formed between the rim ends and an intermediate plate or rim-section 17, corresponding in cross section to the rim, is removably fitted and held between the ends of the rim. This intermediate section is adapted to fit snugly between and close to the gap between the ends of the rim and has an opening 18 extending therethrough for the tire-valve 15. Said opening is formed in a hollow rivet 19 which pivotally connects a connecting plate 20 to section 17. Each end of the rim is provided with an inwardly extending stud 22 which is securely riveted to the rim and has an enlarged tapered inner end or head 23 adapted to enter a socket 24 formed in band 11 and felly 10 to hold one portion of the rim on the wheel body and to permit said portion of the rim with the tire thereon to be placed on and removed from the wheel. Plate 20 is notched as at 24 to fit around studs 22 and when held in its operative position shown in Fig. 2, it will lock the rim 17 and section together and secure the rim against contraction or expansion and will also hold said plate in position to close the gap between the ends of the rim so that the latter will form a complete annulus adapted to extend around the wheel. The plate 20 is adapted to fit against the inner face or periphery of the rim, to hold section 17 in alinement with the ends of the rim. Studs 22 are relatively offset so as to avoid undue cutting away of plate 20. Thus it will be seen, that when section 17 is locked to and between the rim-ends, the rim will be inexpansible whether the tire is present or not.

The tire may be readily placed on the rim when plate 17 is removed, by flexing or contracting the rim within the tire and then permitting it to expand in the tire so that the casing will pass within the rim-flanges. When this has been done the section 17 may be slipped over the valve 15 and the flanges on said section will engage the flanges on the tire. By then turning the locking-plate 20 to engage studs 22, the rim will be complete and the tire will be properly held thereon. When it is desired to separate the rim from the tire, it is only necessary to turn plate 20 away from studs 22 and press the sides of the casing together to release section 17 from the flanges on the casing. Then said plate can be removed to leave a space between the ends of the rim, which will readily permit either end of the rim to be flexed inwardly and laterally, so that the tire may be quickly removed. Since the tire-valve does not pass through either end of the rim, either or both of the rim ends may be sprung inwardly to facilitate removal of the tire from the rim.

The demountable rim is held upon the wheel body by bolts 27 that pass through the felly and are adapted to clamp lugs 28 against one side of the rim to hold the other side firmly seated on a flange 29 of band 11. Plate 20 fits between band 11 and the rim and when the rim is on the wheel one side of plate 20 will engage flange 29 and lock said plate against pivotal movement. That portion of the rim 12 which is disposed diametrically opposite to the valve has riveted thereto, a plate 30 adapted to fit between plates 31 which are riveted to band 11. In placing the demountable rim upon the wheel, the valve 15 is first extended through a hole 33 in the felly and the opposite portion of the rim is then moved into position to bring plate 30 between, and into locking relation with, plates 31. When the rim has been placed upon the wheel, as thus set forth, the inner ends of studs 22 will be disposed in recesses 24 in the wheel-body and each of the ends of the main strip of the rim will be thus interlocked with the wheel-body. The inner end of hollow rivet 19 will also be disposed in the opening in the felly band formed to receive it so that the rim section 17 will also be interlocked with the wheel-body. The rim may then be clamped upon the wheel by bolts 27 and lugs 28.

The invention is not to be understood as restricted to the details illustrated and described since these may be modified within the scope of the appended claims without departing from the spirit and scope of the invention.

Having thus described the invention what I claim as new and desire to secure by Letters Patent is:

1. The combination with a wheel body, of a tire rim comprising a main strip having a gap between its ends so that they may be flexed and a removable one-piece rim section fitting in and filling the space between said ends, a locking device for connecting said ends detachably against separation and spanning said section to hold the same in position when the rim ends are locked thereby, and means for securing the rim removably on the body.

2. The combination with a wheel body, of a tire rim comprising a main strip having a gap between its ends so that they may be flexed and a removable one-piece rim section fitting in and filling the space between said ends, interlocking means between each of said ends and the wheel body, a locking device for connecting said ends detachably against separation and spanning said section to hold the same in position when the rim ends are locked thereby, and means for securing the rim removably on the body.

3. The combination with a wheel-body, of a tire rim comprising a main strip having a short gap between its ends so that they may be flexed and a one-piece rim-section fitting in and filling the space between said ends, a locking plate for detachably connecting said ends against separation, extended between the ends of the main strip and across the gap and connected to hold said section in position when the rim-ends are locked, and means for removably securing the rim on the body, said plate being removable with the section.

4. The combination with a wheel-body, of a tire rim comprising a one-piece main strip having a short gap between its ends so that they may be flexed and a one-piece rim section fitting in and filling the space between said ends, a locking plate for detachably connecting said ends against separation, extended between the ends of the main strip and across the gap and connected to hold said section in position when the rim-ends are locked and means for removably securing the rim on the body, said main strip and section having integral tire-holding flanges, and said plate being removable with the section.

5. The combination with a wheel-body, of a tire rim comprising a main strip having a short gap between its ends so that they may be flexed and a one-piece rim-section fitting in and filling the space between said ends, a locking plate for detachably connecting said ends against separation, extended between the ends of the main strip and across the gap and connected to said section to hold said section in position when the rim-ends are locked, said section having an opening therein for a tire-valve, and means for removably securing the rim on the body.

6. The combination with a wheel-body of a tire-rim comprising a main strip having a short gap between its ends so that they may be flexed and a one-piece rim-section fitting in and filling the space between said ends, a locking plate for detachably connecting said ends against separation, extended between the ends of the main strip and across the gap and connected to said section to hold said section in position when the rim-ends are locked, said section and plate having an opening therethrough for the tire-valve, and means for removably securing the rim on the body.

7. The combination with a wheel-body, of a tire-rim comprising a main strip having a short gap between its ends so that they may be flexed and a one-piece rim-section fitting in and filling the space between said ends, locking-means for detachably connecting said ends against separation, interlocking means between the section and the wheel-body which passes into interlocking relation by placement of the rim on the body, and means for removably securing the rim on the body.

8. The combination with a wheel-body, of a tire rim comprising a main strip having a gap between its ends so that they may be flexed and a one-piece rim-section fitting in and filling the space between said ends, a locking plate for detachably connecting said ends against separation, extended between the ends of the main strip and across the gap and connected to said section to hold said section in position when the rim-ends are locked, interlocking means between the section and the wheel-body which passes through said plate and into interlocking relation by placement of the rim on the body, and means for removably securing the rim on the body.

9. The combination with a wheel-body, of a tire rim comprising a main strip having a short gap between its ends so that they may be flexed and a one-piece rim-section fitting in and filling the space between said ends, locking-means for detachably securing said section in position, interlocking-means between the inner face of each of said rim-ends and the periphery of the wheel-body adapted to secure the rim against circumferential travel on the wheel-body, interlocking-means between the section and the wheel-body, the interlocking means between the rim-ends and the wheel-body and the section and the wheel-body being adapted to pass into interlocking relation by placement of the rim on the body, and means for removably securing the rim on the body.

10. The combination with a wheel-body, of a tire-rim comprising a main strip having a short gap between its ends so that they may be flexed and a one-piece rim-section fitting in and filling the space between said ends, a locking-plate for detachably connecting said ends against separation, extended between the ends of the main strip and across the gap and connected to said section to hold said section in position when the rim-ends are locked by said plate, interlocking-means between the inner face of each of said rim ends and the periphery of the wheel-body adapted to secure the rim against circumferential travel on the wheel-body, interlocking-means between the section and the wheel-body, the interlocking means between the rim ends and the wheel-body and the section and the wheel-body being adapted to pass into interlocking relation by placement of the rim on the body and means for removably securing the rim on the body.

11. The combination with a wheel body, of a tire rim comprising a main strip having a short gap between its ends so that they may be flexed and a one-piece rim section fitting in and filling the space between said ends, a locking plate for detachably connecting said ends against separation, extended between the ends of the main strip and across the gap and connected to said section to hold said section in position when the rim ends are locked by said plate, said rim section and locking plate having registering openings therethrough for a tire valve, interlocking means between the inner face of each of said rim ends and the periphery of the wheel body adapted to secure the rim against circumferential travel on the wheel body, interlocking means between the section and the wheel body disposed in said openings in the rim section and locking plate, the interlocking means between the rim ends and the wheel body and the section and the wheel body being adapted to pass into interlocking relation by placement of the rim on the body, and means for removably securing the rim on the body.

12. The combination with a wheel-body, of a tire-rim comprising a main strip having a short gap between its ends so that they may be flexed and a one-piece rim-section fitting in and filling the space between said ends, locking-means for connecting the section to hold said section in position, a rivet secured to said section and having an opening therethrough for a tire-valve, said rivet projecting from the inner face of the section, the wheel-body having a recess for receiving said projecting portion of the rivet to lock the section to the wheel-body, and means for removably securing the rim on the body.

13. The combination with a wheel-body, of a tire-rim comprising a main strip having a short gap between its ends so that they may be flexed and a one-piece rim section fitting in and filling the space between said ends, a locking plate for detachably connecting said ends against separation, extended between the ends of the main strip and across the gap and connected to said section to hold said section in position when the rim ends are locked, a rivet secured to said section and having an opening therethrough for a tire-valve, said rivet projecting from the inner face of the section and means for removably securing the rim on the body.

14. The combination with a wheel-body, of a tire rim comprising a main strip having a gap between its ends so that they may be flexed and a one-piece rim-section fitting in and filling the space between said ends, a locking-plate for detachably connecting said ends against separation, extended between the ends of the main strip and across the gap and connected to said section to hold said section in position when the rim ends are locked, a rivet secured to said section, and extending through said plate, and having an opening therethrough for a tire-valve, said rivet projecting from the inner face of the plate and means for removably securing the rim on the body.

15. The combination with a wheel body, of a tire rim comprising a main strip having a gap between its ends so that they may be flexed, and a removable rim section fitting in and filling the space between said ends, a locking device pivoted to said section for detachably connecting said ends against separation, and means for removably securing the rim on the body.

16. The combination of a wheel-body, a split tire-rim having tire-holding flanges, the ends of the rim being spaced apart, an intermediate section fitting between the rim-ends and having tire holding flanges, an inwardly projecting stud on each end of the rim, the ends of the studs being disposed to fit into the wheel-body, a connecting plate, a hollow-rivet pivotally connecting said plate and said section, the plate being disposed against the inner face of the rim and having means for engaging said studs to secure the rim ends and said section together, and means for removably securing the rim on the wheel-body.

17. The combination of a wheel-body, a tire-rim having its ends spaced apart, an intermediate section fitting between the ends of the rim, said section and rim having tire-holding flanges, a connecting plate pivoted to said section, a stud on each end of the rim, a connecting plate pivoted to said section and having notches in its opposite sides for receiving and engaging said studs and disposed at the inner face of the rim, means on the wheel-body for engaging the plate to secure it against pivotal movement, and means for removably securing the rim to the wheel body.

18. The combination of a wheel-body, of a split tire-rim, having its ends spaced apart, an intermediate removable section fitting between the ends of the rim, the latter and said section having tire holding flanges, a plate pivoted to said section, said section and plate having an opening through for a tire valve, said plate being pivoted to swing laterally and disposed at the inner face of said rim, a stud on each end of the rim, offset relatively to each other, said studs having terminals adapted to extend into the wheel-body, and means for detachably securing the rim to the wheel body.

19. A wheel rim having separated ends, a filler plate adapted to bridge the interval between the separated ends, and a locking plate swiveled on the filler plate and adapted to lock the plate and the separated ends in alinement.

20. A wheel rim having separated ends, a filler plate adapted to bridge the interval between the separated ends, studs on the separated ends, and a keeper plate swiveled on the filler plate and adapted to engage the studs to hold the filler plate in position.

21. A wheel rim having separated ends, a filler plate adapted to bridge the interval between the separated ends and provided with a tubular rivet forming an opening for a tire air nipple, and a keeper journaled on the rivet and engaging the separated ends for holding the filler plate in position.

CHESTER C. HARBRIDGE.

Witnesses:
FRED GERLACH,
FRANK W. BEMM.